United States Patent

Farrag

[11] Patent Number: 5,711,005
[45] Date of Patent: Jan. 20, 1998

[54] METHOD FOR IMPLEMENTING A PERSONAL ACCESS COMMUNICATION SYSTEM IN A HIGH MOBILITY ENVIRONMENT

[75] Inventor: Osama Farrag, Gaithersburg, Md.

[73] Assignee: Hughes Electronics, Los Angeles, Calif.

[21] Appl. No.: 689,167

[22] Filed: Aug. 6, 1996

[51] Int. Cl.⁶ .................................................. H04Q 7/20
[52] U.S. Cl. ........................ 455/441; 455/443; 455/444
[58] Field of Search ........................... 455/33.2, 33.3, 455/33.4, 34.1, 54.1, 56.1, 62, 63; 379/60

[56] References Cited

U.S. PATENT DOCUMENTS

| | | | |
|---|---|---|---|
| 5,278,991 | 1/1994 | Ramsdale et al. | 455/56.1 |
| 5,345,499 | 9/1994 | Benveniste | 455/33.2 |
| 5,361,399 | 11/1994 | Linquist et al. | 455/56.1 |
| 5,381,443 | 1/1995 | Borth et al. | 375/1 |
| 5,396,645 | 3/1995 | Huff | 455/33.3 |
| 5,457,810 | 10/1995 | Ivanov et al. | 455/33.2 |
| 5,499,386 | 3/1996 | Karlsson | 455/33.2 |
| 5,517,675 | 5/1996 | O'Connor et al. | 379/60 |
| 5,530,910 | 6/1996 | Taketsugu | 455/33.2 |
| 5,539,744 | 7/1996 | Chu et al. | 455/33.2 |

FOREIGN PATENT DOCUMENTS

| | | | |
|---|---|---|---|
| 62-101135 | 5/1987 | Japan | 455/33.4 |
| 3-196722 | 8/1991 | Japan | 455/33.4 |

Primary Examiner—Reinhard J. Eisenzopf
Assistant Examiner—Sam Bhattacharya
Attorney, Agent, or Firm—John Whelan; Wanda Denson-Low

[57] ABSTRACT

A method for increasing the high mobility capacity of a personal access communications system (PACS) includes provides high and low tier channel links to service high and low speed subscriber units, respectively. The subscriber units determine their relative speed and select from among the high and low tier channels available to them based upon self-determined velocity and signal quality measurements.

16 Claims, 7 Drawing Sheets

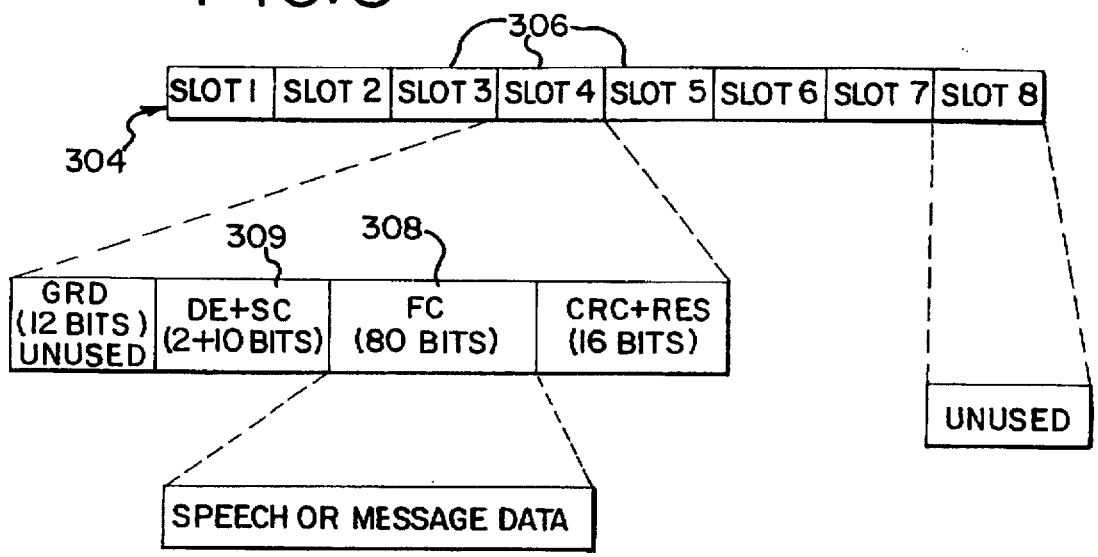
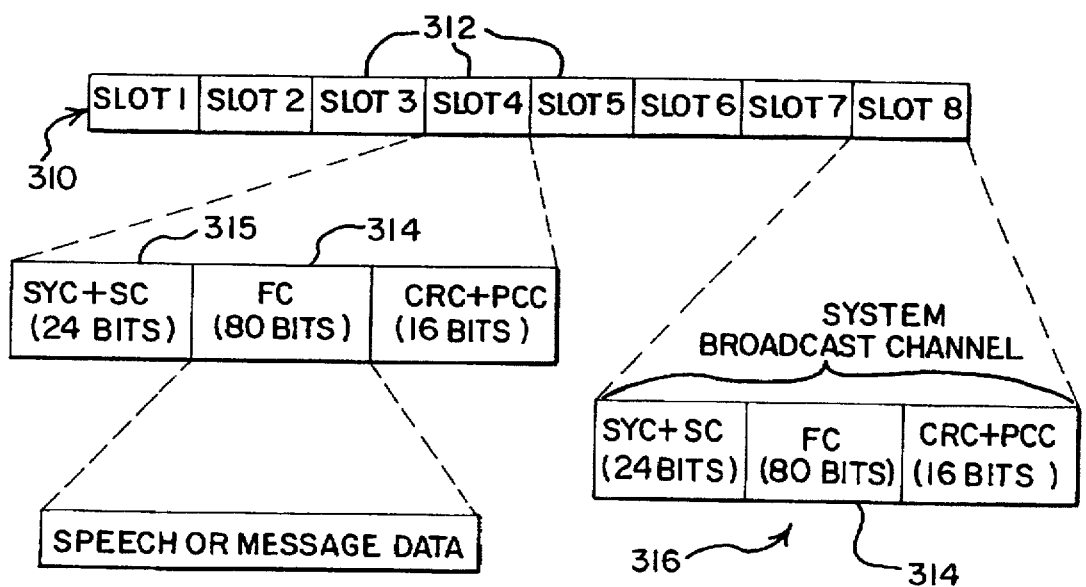

METHOD FOR IMPLEMENTING A PERSONAL ACCESS COMMUNICATION SYSTEM IN A HIGH MOBILITY ENVIRONMENT

BACKGROUND OF THE INVENTION

This invention relates to an improved method for handling call flow in a personal communication services (PCS) environment. More particularly, this invention relates to improving the capacity of a personal access communications system (PACS) to handle highly mobile transmitters operating within the system.

Wireless personal communication services (PCS), such as Wireless Access Communications Systems (WACS) and Personal Access Communications Systems (PACS), strive to provide flexible communications services in a wireless fashion. Unlike typical cellular telephone systems, PCS systems tend to operate at lower transmission power levels and offer more flexibility to service providers and users. WACS and PACS, in addition to providing a system for improving or eliminating dropwire requirements to homes and businesses, provide some mobile wireless services. Radio transmitters are the vehicle for eliminating the need for wiring.

A consortium of telecommunication entities proposed a standard for providing WACS PCS. Further details concerning this proposed standard are set out in Bellcore Corporation Publication TR-INS-001313 entitled "Generic Criteria for version 0.1 Wireless Access Communications Systems (WACS)" published October 1993. This publication is available from Bellcore Corporation at Bellcore, Customer Services, Eight Corporate Place, Room 3C-183, Piscataway, N.J. 08854-4156 or at 1-800-521-CORP. Additionally, the U.S. Telecommunications Industry Association (TIA) has recently approved a PACS standard as set forth in PACS air specification J-STD-014. The reader is presumed to be familiar with these specifications and with related technological issues known to those having ordinary skill in the art.

The WACS and PACS specifications describe an architecture for a wireless PCS system including subscriber units (SUs), radio ports (RPs), one or more radio port controllers (RPCs), and an access manager (AM). The SUs transmit information to the RPs using radio frequencies. The SUs may be fixed or mobile transceiver units. RPs are usually small, low power devices that are typically mounted on a utility pole and connected to an RPC using wireline facilities. Each RPC is connected to a switch that is part of the public switched telephone network (PSTN), and each RPC is connected to the AM. The AM provides overall coordination of RPCs and high-level control of the entire system.

The Bellcore "Generic Criteria" also describes a conventional method of handing off a call from a first RP to a second RP known as automatic link transfer (ALT). The ALT protocol described in the PACS air standard contemplates low mobility subscriber units in a wireless system. The TIA PACS air interface standard describes a process for subscriber units to select the best channel for an established call. However, the PACS protocol was originally intended for pedestrian or low speed vehicle use. Because PCS service providers tend to have large capacity networks comprised of a large number of small coverage areas, or microcells, subscriber units moving at high speeds will travel through each microcell in a very short period of time. Thus, the subscriber unit must perform an automatic link transfer (ALT) operation very frequently in order to maintain the established link. Frequent ALT operations tend to reduce the voice quality for a call.

At high speeds, such as 50 to 65 mph, a SU may experience frequent handoffs as a mobile SU moves in and out of transmission range of different RPs. Each handoff, or ALT, incurs some amount of speech loss when the call is transferred from one RP to another. Excessive loss of speech during an ALT results in an audible pop or click. Accordingly, there is a need for an improved method and system of managing high mobility subscriber units in a wireless personal communications system. Specifically, there is a need for limiting the number of ALTs in a wireless personal communications system so that excess speech loss is minimized in high speed environments.

SUMMARY OF THE INVENTION

The present invention relates generally to wireless personal communication systems, and more particularly to an improved method for facilitating high quality voice service for high speed vehicles in a PACS system.

A preferred embodiment includes the steps of first providing a PACS system having a plurality of high and low tier coverage areas. Each of the high tier coverage areas covers a large geographical area and encompasses a predetermined number of low tier coverage areas. An RPC transmits a list of high tier channels via an RP to a subscriber unit. The subscriber unit next determines its speed. The subscriber unit then selects a channel in one of the high or low tier coverage areas based upon its self determined speed. In a preferred embodiment, the subscriber unit also measures signal strength and signal quality of available high and low tier channels. Predetermined threshold and hysteresis values are used by the subscriber unit to favor switching to a high tier channel when the subscriber unit determines that it is travelling at a high speed.

The invention itself, together with further attendant advantages, will best be understood by reference to the following detailed description, taken in conjunction with the accompanying drawings.

BRIEF DESCRIPTION OF THE DRAWINGS

FIG. 5 is a preferred message format for an SU to RP uplink message in a PACS system.

FIG. 6 is a preferred message format for a RP to SU downlink message in a PACS system.

DETAILED DESCRIPTION OF THE PREFERRED EMBODIMENTS

The presently preferred method and data structures for improving high mobility performance in a wireless communications system may be implemented on any of a number of existing PCS systems. FIGS. 1–4 illustrate one preferred system and are described below. As will be apparent to those of ordinary skill in the art, other hardware implementations may be used to implement the presently preferred method.

Figure 1:
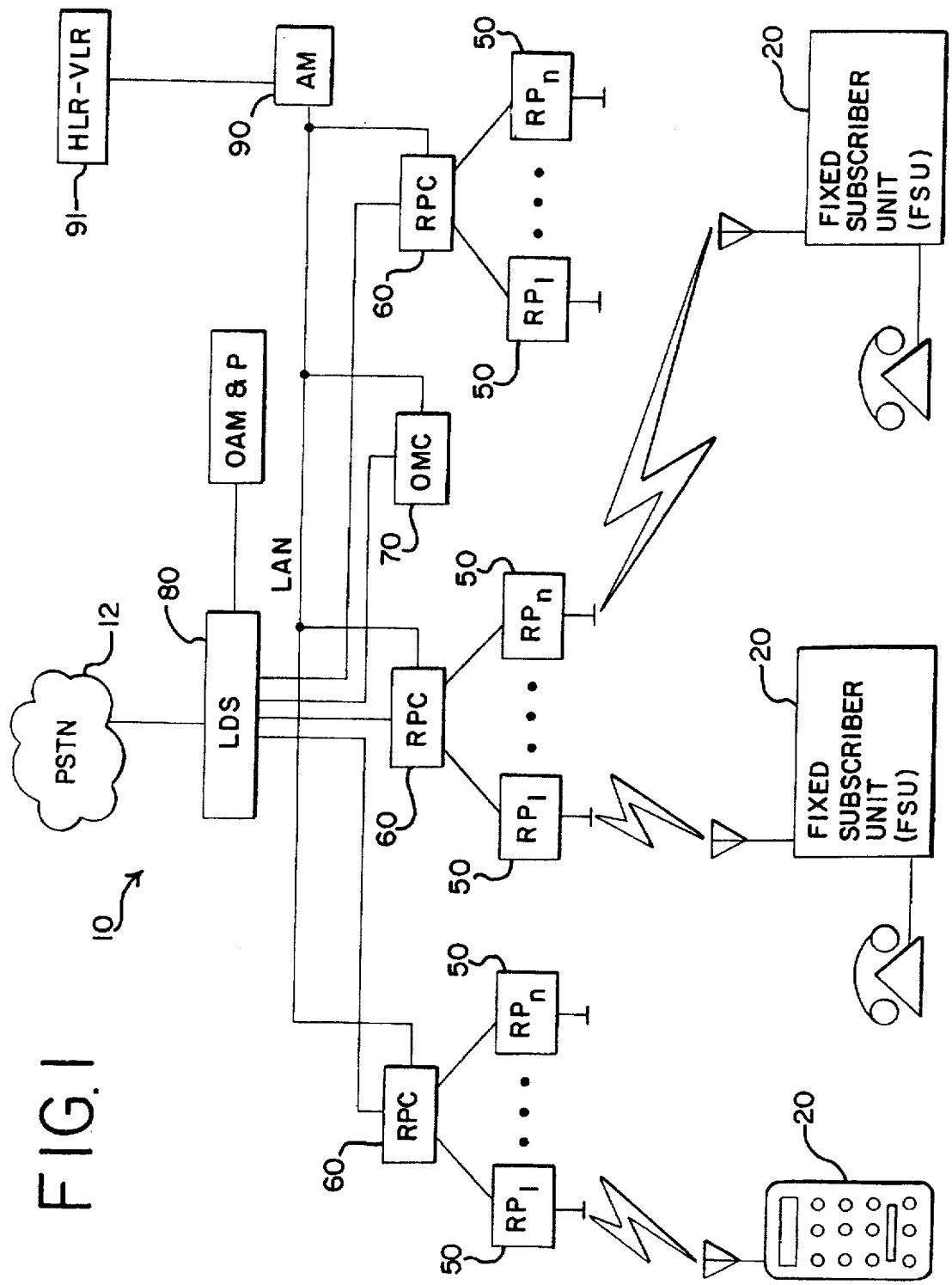
FIG. 1 is a block diagram of a wireless personal communications system capable of performing the preferred method.

FIG. 1 illustrates a general block diagram of a wireless personal communication system 10 that may be used for PACS. The system 10 includes subscriber units (SU) 20, transceiver units which may be radio ports (RP) 50, radio port control units (RPC) 60, an operations maintenance center (OMC) 70, a local digital switch (LDS) 80, and an access manager (AM) 90. The SU 20 communicates with the radio port 50 via radio links. Each RP 50 communicates with an RPC 60 via transmission lines, typically standard T1 lines. The RPC 60 controls radio links and transmission lines carrying various voice and data communications. The switch 80 controls access between one or more wireless systems 10 and the public switch telephone network (PSTN) 12. The AM 90 provides call control, communicates with the switch 80 to provide voice paths between the PACS network and the PSTN, and connects to a home location register-visitor location register (HLR-VLR) 91.

The SU may be either a fixed subscriber unit or a portable subscriber unit. The SU 20, fixed or portable, provides voice and data quality comparable to a wired system. Unlike many cordless and cellular phones, the portable SU 20 digitally processes and filters all voice signals prior to broadcasting. An SU 20 may be located in the home or the office, or in a pedestrian, automobile, or other mobile environment. Multiple SUs 20 may be in range of a single RP 50 and may be in broadcast range of each other. Unless otherwise indicated, the term subscriber unit (SU) applies to both the fixed and the portable versions in the following descriptions. The SU 20 also may include a plurality of, and preferably two, receive chains connected to the two antennas to assure optimum reception in a fast fading environment encountered during high vehicular mobility.

Figure 2:
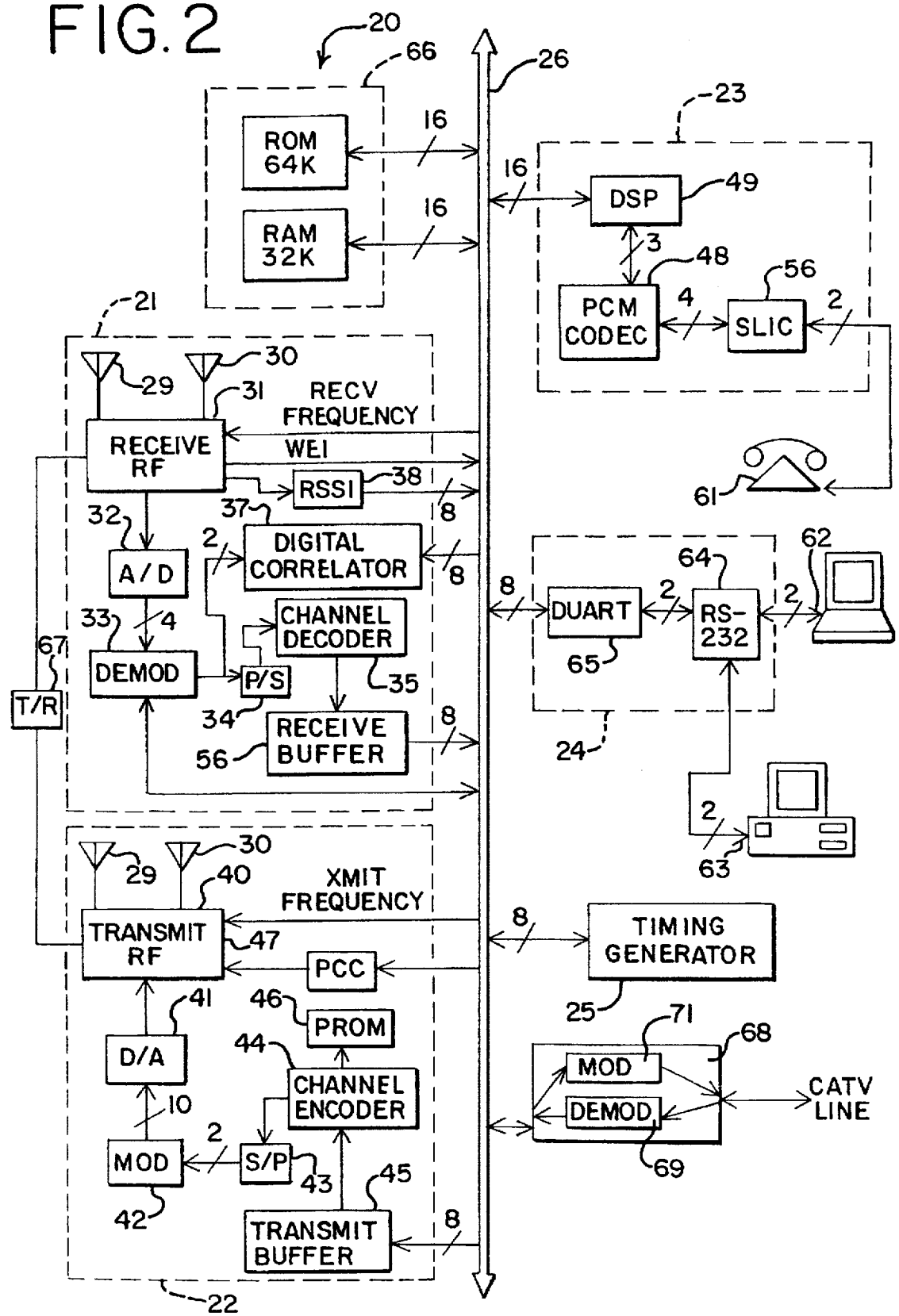
FIG. 2 is a block diagram of a preferred embodiment of a subscriber unit for use in the wireless personal communications system of FIG. 1.

Referring to FIG. 2, a preferred implementation of an SU 20 is shown in greater detail. The SU 20 has five connections to the outside environment: an RF receive antenna 30, an RF transmit antenna 29, a telephone connection 61, a data port 62, and a debug port 63. Internally, the subscriber SU 20 comprises an RF receive section 21, an RF transmit section 22, an analog port 23, a digital dataport 24, a timing generator 25, a memory section 66, and a databus 26 connecting all the internal blocks together.

The RF receive section 21 receives an RF input signal from the antenna 30. As shown in FIG. 2, there appear to be two antennas 29, 30 connected to the receive section 21. One antenna 29 is actually switched between the transmit and receive sections 21, 22 in standard PACS PCS. The RF section 21 recovers voice information from the RF signal in the form of a 32 kilobit per second (kbps) ADPCM signal. The RF section 21 also demodulates correlation information in the RF input signal. The received information, whether voice or data, is then placed on the databus 26. Conversely, the RF transmit section 22 receives voice or data information from the databus 26 and performs the function of transmitting voice or data information. Voice information is compressed to 32 kbps ADPCM and data information is simply modulated onto RF signals for transmission.

The analog port 23 receives analog information such as from an analog telephone and converts it to digital 32 kbps ADPCM for further processing and transmission over a radio link. Voice information arriving from the databus 26 in 32 kbps ADPCM form is converted to an analog signal and is communicated to a telephone connected to the port 23. The digital port 24 manages data signals sent to and from both the debug port 63 and the data port 62. The databus 26 is a 16-bit wide data line connecting the various internal functions of the SU 20.

A standard two wire loop may connect the analog port 23 to a standard analog telephone. Analog voice signals picked up at the handset of the telephone will be converted in a subscriber line interface chip (SLIC) 56 from the two wire signal to a four wire signal. The four wire format voice signals are sampled and coded into a 64 kilobit per second mu-law pulse code modulated (PCM) signal by a PCM codec 48 in the SU 20. The digital signal is then processed in the digital signal processor (DSP) 49 which compresses the PCM signal into a 32 kbps ADPCM signal. In a portable SU the SLIC 56 is unnecessary because the voice signals are received from a mouthpiece attached to the portable SU.

In the SU, the DSP 49 sends the ADPCM signal along a databus 26 to the RF transmit section 22 where it enters a transmit buffer 45. The digital signal is temporarily stored in the transmit buffer 45 and then is transferred to the channel encoder 44. The channel encoder 44 encodes the digital signal with synchronization information in accordance with instructions stored in a programmable read only memory (PROM) 46 integrated circuit. The program stored in the PROM 46 is a decoding and encoding algorithm such as that disclosed in the PACS specification which anyone of ordinary skill in the art may program into a PROM or other memory device. The encoded digital signal is transported through a serial-to-parallel (S/P) converter 43 to a modulator 42. The encoded signal is then converted from digital to analog in a digital-to-analog (D/A) converter 41 and transmitted from the transmit RF section 40 by an RF antenna 29.

Digital data signals originating at the digital input port 24 follow a different path. Initially, the signal coming in at a digital port 24 passes through an RS-232 connection 64 into a DUART device 65. The data information signal, unlike a voice signal, is not compressed into ADPCM format. The digital data signal is not processed in the PCM codec 48 or DSP 49. Instead, it proceeds along the same databus 26 as the voice signals and goes directly to the transmit buffer 45, the encoder 44 and then to the MOD 42 for modulation onto a carrier frequency. After modulation, the signal (regardless of whether voice or data) is then converted to an RF signal approximately within the range of 1.8 to 2.2 GHz and transmitted from the RF transmit section 22.

Signals received by the SU 20 from a PACS PCS system first arrive at the RF antennas 29, 30 and are processed through a receive RF unit 31. The received analog signals are converted to digital form in an analog-to-digital (A/D) converter 32 and then demodulated in a demodulator 33. The demodulated wave form is then passed through a parallel-to-serial (P/S) converter 34, decoded in a channel decoder 35, and passed through a receive buffer 36. As part of the demodulation and decoding of the signal, the signal is also passed through a digital correlator 37 to analyze timing synchronization. The decoded signal in the receive buffer 36 then passes on to the databus 26 to the appropriate analog or digital port 23, 24 as determined by the DSP 49. Suitable parts for the A/D and D/A converters 32, 41 are a CXD1175AM-T6 A/D converter and a CXD1171-T6 D/A converter available from Sony Corporation. The Demod and Mod 33, 42 may be a field programmable gate array (FPGA), such as the Xilinx XC4013 available from Xilinx at 2100 Logic Drive, San Jose, Calif. 95124-3400, programmed to meet the modulation requirements set forth in the PACS specification.

The central processing unit managing the processes in the SU 20 may be a digital signal processor (DSP) 49. A Texas Instruments TMS320C50 DSP chip is suitable and other DSP chips, such as a TI TMS320C53, may also be used. Additionally, the SU may be designed to incorporate a microcontroller, such as an 8051 type microcontroller, rather than a DSP. As will be apparent to those of ordinary skill in the art, the presently preferred method is not limited to operation on any one specific implementation of a SU.

The DSP 49 is used for both signal controls and performing the 32 kbps ADPCM speech encoding/decoding. The DSP 49 operates as a 16-bit parallel load processor utilizing a 16-bit wide data bus 26. The DSP 49 is driven by a clock frequency received from the RF transmit 22 and receive 21 sections. The clock frequency is approximately 16 MHz but higher or lower frequencies may be used.

Two components in the SU 20 require the attention of the DSP 49. The DUART 65, which handles data flow, and the channel encoder/decoder 44, 35, both generate interrupts to indicate that there is incoming data or that the component is ready for more data. The channel encoder/decoder 44, 35 is preferably a single chip such as a Xilinx XC4005-6PQ208C available from Xilinx. The channel encoder/decoder 44, 35 generates two separate interrupts; one for encoding and one for decoding.

The channel encoder 44 encodes a digital voice signal with the proper digital correlation information. The encoded signal is then modulated using π/4 differential quadrature phase shift keying (DQPSK) in PACS, with a raised-cosine spectral shaping filter. One method of encoding voice data generated at the SU 20 is to take the 64 kbps mu-law PCM signal created at the PCM Codec 48 and encode the information into 32 kbps ADPCM. The DSP 49 performs the encoding based on the CCITT Recommendation G.721 standard algorithm.

In standard PACS PCS, the radio port (RP) 50 performs the basic function of transmitting and receiving voice and data information between the SU 20 and the RPC 60. The RP 50 exchanges information with one or more SUs 20 over a radio link at RF frequencies, in the range of 1.8 to 2.2 GHz. The RP 50 may exchange information with a single RPC 60 over a standard T1 transmission line. In addition, one or more RPs 50 may communicate with the RPC 60 over a DS1 interface, a high bit-rate subscriber line (HDSL) interface, or using T1 interface methods.

Voice and data signals broadcast from an SU over a radio link at RF frequencies are received at the RP 50. The RF frequencies are downconverted from the RF frequencies to a 384 kbps data stream (in PACS). The 384 kbps data stream is decoded, processed, and then sent over a T1 line connected to an RPC. The decoded information received from an SU 20 and sent on to the T1 line is preferably in a 32 kbps ADPCM format. Conversely, ADPCM signals received from the RPC are processed, encoded, and converted to RF frequencies for transmission to an SU 20.

Figure 3:
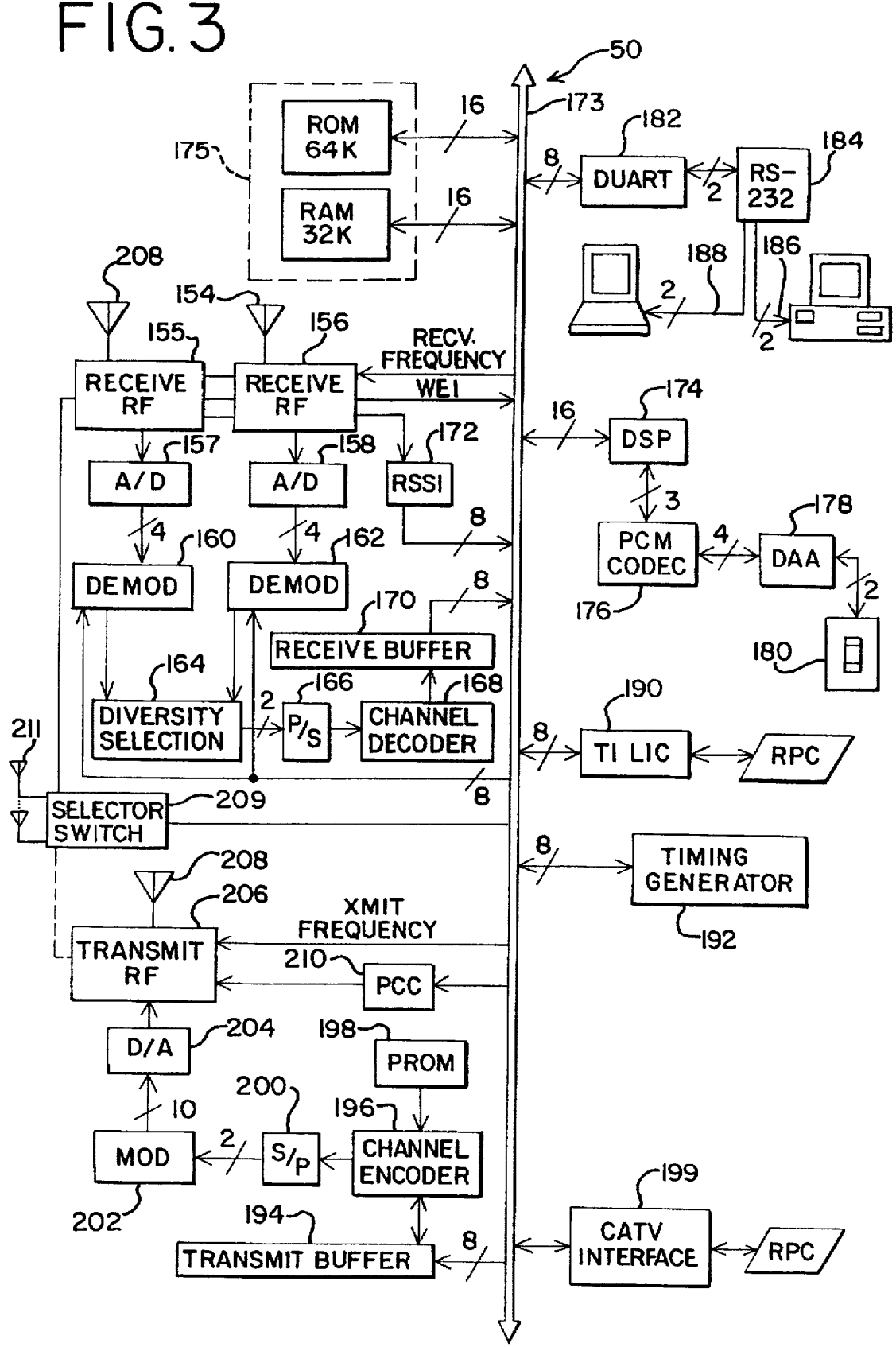
FIG. 3 is a block diagram of a preferred embodiment of a radio port for use in the wireless personal communications system of FIG. 1.

FIG. 3 illustrates the RP 50 in more detail. The RP 50 receives RF frequency signals from one or more SUs 20 on a pair of spatially diverse antennas 152, 154. The RP 50 is tuned to receive a particular frequency by the digital signal processor (DSP) 174, such as a TMS320C53. Alternatively, an 8051 type microcontroller may be used rather than a DSP. The received signal from the SU 20 is then downconverted in the receive RF sections 155, 156 respectively attached to the spatially diverse antennas 152, 154. Each receive RF section 155, 156 downconverts the same frequency and channels the downconverted signal to an analog-to-digital (A/D) converter 157, 158 respectively attached to the receive RF sections 155, 156. The A/D converters 157, 158 may be 8 bit, 20 Megasample per second A/D converters such as a CXD1175AM-T6 manufactured by Sony Corporation. The digital signals are transferred to modem demodulators 160, 162, which may be implemented as a Xilinx XC4005 or Xilinx 4013 chip. Once the digital signals have been demodulated in the demodulating sections 160, 162 they are compared in a diversity selector 164.

Following reception and downconversion of the RF frequencies and diversity selection, the signal is then processed through a parallel-to-serial (P/S) converter 166 and input in serial format to a channel decoder 168. The channel decoder 168 decodes the correlation information. The channel decoder 168 may comprise a Xilinx XC4005-6PQ208C chip. Information decoded in the channel decoder 168 is then forwarded to a receive buffer 170 prior to being sent on a databus 173 to a destination determined by the DSP 174. Voice information is transmitted along the databus 173 to the DSP 174. The DSP 174 then passes the 32 kbps ADPCM signal to the PCM Codec 176. The PCM Codec 176 receives the ADPCM signal and decodes it into an analog signal. The analog signal is then processed in a Data Access Arrangement (DAA) 178 for transmission along telephone lines.

Voice information received from the telephone lines or the RPC 60 is transferred along the databus 173 to the transmit buffer 194 in preparation for encoding in a channel encoder 196. The channel encoder may be a Xilinx XC4005-6PQ208C chip. The encoder 196 may be programmed with an algorithm, such as is disclosed in the PACS specification, in firmware installed in a PROM 198. The RP 50 also has a memory block 175 for extra program storage capability. The channel encoder 196 encodes the received 32 kbps ADPCM signal with information regarding timing and synchronization.

The encoded ADPCM signal is processed through a serial-to-parallel (S/P) 200 device to configure the signal for modulation in a modulator 202 which then transfers the signal to a digital-to-analog (D/A) converter 204. After conversion to analog form, the modulated signal is then converted to an RF transmission signal in a transmit RF section 206. The RF signal containing the encoded data is then transferred along the transmit antenna 208 to the appropriate SU 20. For transmission of data where no encoding is necessary the encoder 196 and S/P converter 200 are bypassed and the databus 173 is directly connected to the modulator 202. This decision may be controlled by the DSP 174.

Figure 4:
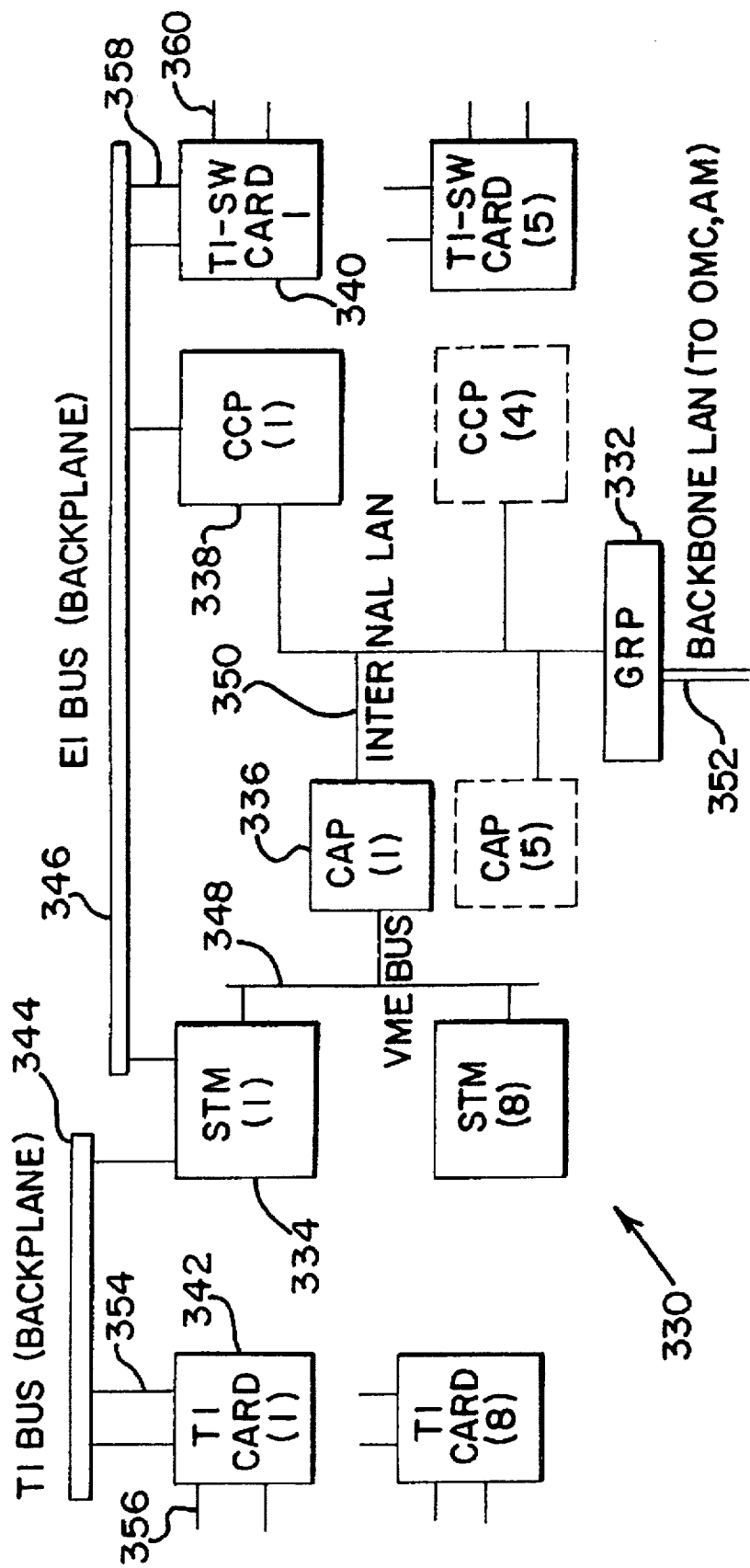
FIG. 4 is a block diagram of a preferred embodiment of a radio port controller for use in the system of FIG. 1.

A central component in the wireless personal communication system is an improved radio port controller (RPC) 330 as shown in FIG. 4. The RPC 330 manages RP 50 resources and controls the transport of information between a network switch 80 and its associated RPs 50. The RPC 330 interfaces with at least one RP 50 and with at least one switch 80. The RP 50 interface is preferably a DS1 layer 1 unchannelized interface allowing a 1.544 Mb/s clear channel and a TDM/TDMA layer 2 interface mapping the TDM/TDMA time slots to the DS1 channel. The RPC 330 to switch 80 interface may be a DS1 physical interface using the multiplexed ISDN Basic Rate Interface BRI communication protocol defined in the Bellcore specification.

In the basic configuration contemplated by the Bellcore specification, the RPC 330 performs call processing functions and transcodes compressed data into full PCM data and vice-versa. The RPC 330 exchanges signaling information with the SU 20 via the RP 50 and collects performance monitoring information (e.g. radio link quality, channel usage, channel allocation, traffic data, and system capacity information).

The RPC 330 includes a global resource processor (GRP) 332, a switching transcoder module (STM) 334, a common access processor (CAP) 336, and a call control processor (CCP) 338. The GRP 332 communicates over a backbone LAN 352 to the OMC 70 and to the AM 90. The GRP 332 also communicates with at least one CAP 336 and at least one CCP 338 over an internal LAN 350. The GRP 332 provides access to the external backbone LAN 352 and performs network management and other centralized RPC 330 functions. Each CAP 336 preferably communicates with up to eight STMs 334 over a high speed VME bus 348. Each STM 334 is connected to both the T1 bus 344 and the E1 bus 346. Also, each CCP 338 is connected to the E1 bus 346. The RPC 330 preferably includes up to five CAPs 336, and four CCPs 338. Additional components such, as extra GRPs 332, CCPs 338, CAPs 336 and STMs 334, may be supported in the RPC 330.

In a high mobility environment, the RPC preferably streamlines internal processing by processing layer 2 messages in the CAPs 336 under interrupts. Other than the message formats discussed below, the layer 2 messages are set forth in the PACS specification. The layer 2 messages include automatic link transfer messages. The STMs and CAPs are preferably synchronized to the message frames broadcast over the air between the SUs and RPs. By synchronizing the processing in the CAPs and STMs with the broadcast message frames, and using standard interrupt techniques to notify the RPC of incoming layer 2 messages, response to these layer 2 messages may be faster and voice loss minimized.

The RPC 330 also includes a T1 bus 344 and an E1 bus 346. The T1 bus 344 interfaces to a plurality of RP T1 cards 342. Each T1 card 342 can support up to two T1 lines 356, each interfacing with an RP 50. The T1 card 342 communicates with the T1 bus 344 over a T1 bus slot connector 354. Similarly, a T1 switch card 340 may communicate with the switch over two T1 lines 360. The T1 switch card 340 is coupled to an E1 bus slot connector 358 connected to the E1 bus 346. The RP T1 card 342 may be installed in slots 1, 3, 5, 7 of a backplane (not shown) providing up to 8 T1 lines to the RPs 50. The switch side T1 cards 340 may be installed preferably in slots 9, 10, 11, 12, 13 of the backplane providing up to 10 T1 lines 360 to the switch.

In standard PACS PCS, the SU 20 employs a time division multiple access (TDMA) method of communicating digital information to a radio port 50. As best seen in FIG. 5, the formatted information transmitted from the SU 20 to the RP 50 is arranged in uplink message frames 304, each frame 304 comprising eight time slots 306. The SU 20 broadcasts information onto one of the time slots 306 in radio transmission bursts to the RP 50.

Each 120 bit burst (in PACS) of information lasts approximately 312.5 microseconds (2.5 milliseconds/8 timeslots) and is synchronized such that the burst always corresponds with an appropriate time slot 306 that the SU 20 reserved for the particular transmission. Each time slot 306 of the transmitted message frame 304 carries information necessary to synchronize the SU's 20 transmission burst. Each TDMA burst from an SU 20 contains several information fields: guard band (GRD), differential encoding (DE), slow channel (SC) 309, fast channel (FC) 308, cyclic redundancy check (CRC), and a reserved bit (RES).

FIG. 6 depicts the downlink message frame 310 received by an SU 20. An RP 50 transmits voice or data information to an SU in time division multiplex format. TDM transmissions are continuous radio transmissions as opposed to the TDMA bursts. Again the SU 20 is allocated a specific 120 bit (in PACS) time slot 312 in the frame 310. The time slot 312 includes a synchronization pattern (SYC), a slow channel (SC) 315, a fast channel (FC) 314 containing the voice or data transmitted from the RP 50, a cyclic redundancy code (CRC), and power control channel (PCC) information. Additionally, each downlink frame contains a dedicated timeslot that is used as a system broadcast channel (SBC).

The SBC may be used to carry three types of logical channels: general system information in a system information channel (SIC), alert messages in an alert channel (AC), and a priority request channel (PRC) that is used to provide support for emergency calls when no other time slot is available. The SIC is transmitted in the FC 314 of the SBC 316. The SIC may carry service provider information, encryption parameters, and protocol parameters including counter and timer values.

Figure 7:
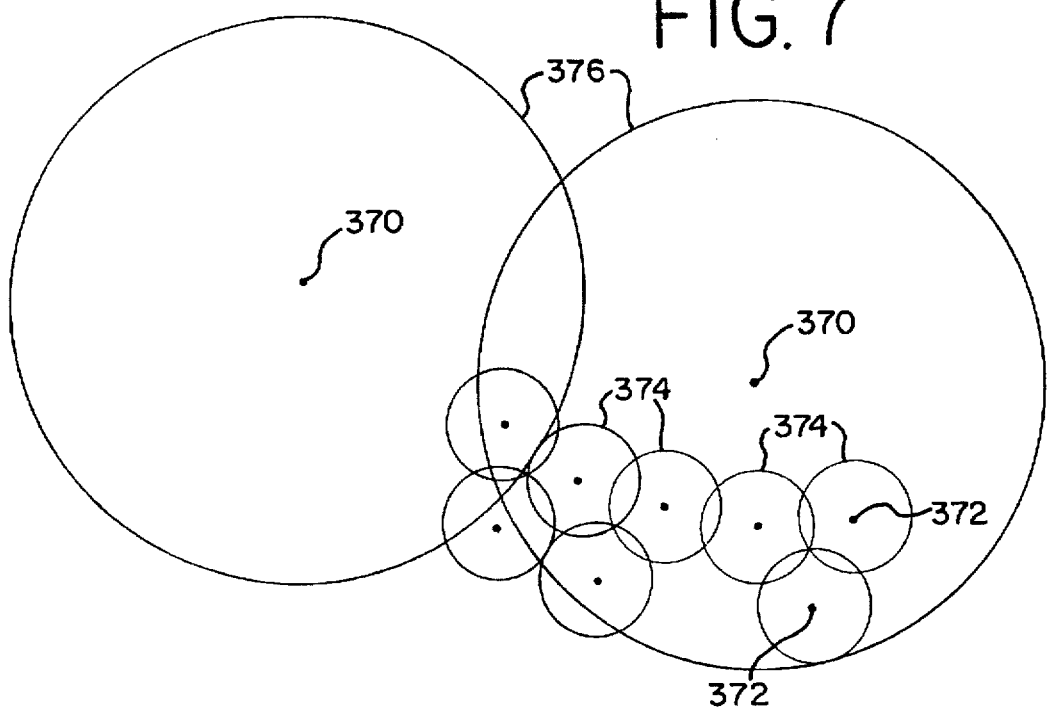
FIG. 7 is an illustration of a preferred geographic coverage configuration for high tier and low tier channels.

Using communications hardware such as the wireless personal communication system discussed above, FIG. 7 illustrates a geographic coverage area of a personal access communication system (PACS) using a preferred method of the present invention. Preferably a PACS system optimized for high mobility use includes at least one radio port designated as a high tier radio port 370 and a plurality of radio ports designated as low tier radio ports 372. The high tier radio port 370 has a geographic coverage area 376 that is greater than, and encompasses, several smaller coverage areas 374 of low tier radio ports 372. Preferably, the low tier radio ports 372 are used by pedestrian and other low speed users while the high tier radio ports 370 service more mobile or high speed users. Alternatively, several high tier coverage areas 376 may overlap without the need of low tier radio ports 372 where the system is primarily used high speed vehicles. In order to optimize utilization of a PACS network and minimize the number of radio link handoffs, high tier radio ports are preferably to be used only by high speed subscriber units unless radio channel availability or quality requires that a low speed subscriber unit communicate with the high tier RP.

In one preferred embodiment, each high tier coverage area may be serviced by a high tier RP having up to a five mile radius transmission range and each low tier cell may be serviced by a low tier RP having up to a one mile radius transmission range. The desired coverage areas for high an low tier radio ports may be accomplished by adjusting the broadcast power of the radio ports. Thus, the broadcast power of high tier RPs would be increased according to the requirements of a particular system design. The antenna height of high tier radio ports may be increased to improve coverage. Any of a number of power, encoding and error correction techniques known to those of ordinary skill in the art may also be used to provide the necessary high tier radio port coverage.

According to a preferred embodiment of the present method, each mobile unit, or subscriber unit, determines its own relative velocity. Preferably, the subscriber units determine their velocity by calculating the frequency of automatic link transfer (ALT) operations performed within a specific time period. Every time a subscriber unit has its radio link transferred from one radio port to another radio port, the subscriber unit increments an ALT counter in memory. Each subscriber unit preferably has a velocity determination timer (TS230) that stores a predetermined period of time used to calculate the frequency of ALT operations.

The velocity determination timer is a numerical time period provisionable via the system information channel (SIC) broadcast from a radio port with a default value of 2 minutes. This period may range from 1 to 5 minutes. Additionally, the subscriber unit contains a provisionable high speed threshold parameter (NS230) for storing a predetermined value representing the minimum number of ALTs performed within the TS230 period in order for the subscriber unit to assume that it is moving at a high speed. In one embodiment, the parameter defaults to 5 and may range from 2 to 15 ALTs. A maximum ALT parameter (NS231) sets the maximum number of ALTs performed within a TS230 period in order for the subscriber unit to assume that it is moving at a low speed. Preferably this parameter would default to 1 and may range from 0 to 6 ALTs.

A second hysteresis value parameter (NS240), used in conjunction with a received signal strength indication (RSSI) measured at an SU, is included which determines the bias of the subscriber unit towards favoring high tier channels when a subscriber unit is already moving at a high speed. The same hysteresis value parameter is used to bias the subscriber unit towards favoring low tier channels when the subscriber unit is already moving at a low speed. The default value for this parameter is preferably 2 dB. The parameter may range from 0 dB to +10 dB. The subscriber unit also adjusts a second carrier to interference quality indication (QI) saturation parameter (NS270) for use in its determination of whether to choose a high tier or low tier channel. The second QI saturation parameter causes the subscriber unit to favor low tier channels when the subscriber unit already assumes that it is moving slowly. Conversely, the second QI saturation parameter causes the subscriber unit to favor high tier channels when it is moving at a high speed. As with the second hysteresis value parameter, the second QI saturation parameter preferably defaults to 2 dB and has a range from 0 dB to +10 dB.

Figure 8:
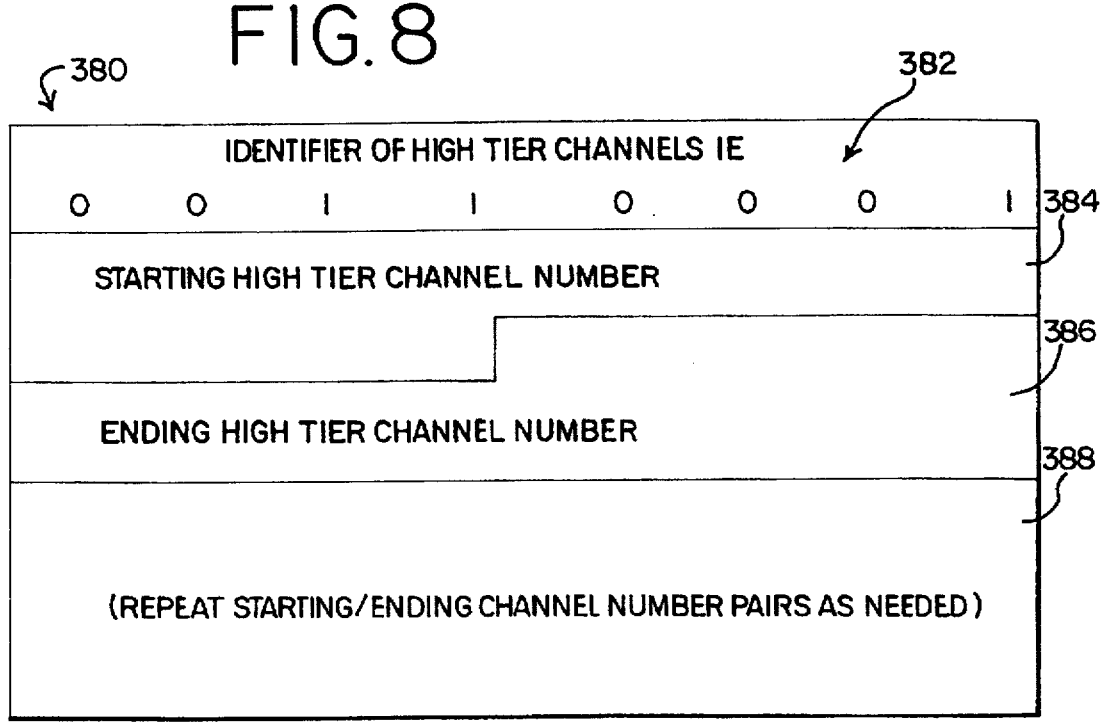
FIG. 8 is a preferred format for an information element containing a high tier channel list for use in the method of FIG. 9.

In a preferred embodiment, a PACS network provides a list of high tier channels to subscriber units over the system information channel (SIC) broadcast from a RP in the system broadcast channel. As illustrated in FIG. 8, the list of high tier channels may comprise a high tier channel information element 380. As with information elements already provided for in the PACS standard, the high tier channel information element is made up of a variable number of "octets" consisting of eight bit strings of data. The high tier channel information element 380 is identified with a high tier channel ID octet 382.

In standard PACS, the system provides a list of all available RF channels to subscriber units. In this manner a service provider can inform users of a range of operating frequencies supported by the service provider. The system broadcasts an information element in the system information channel containing the range of supported RF frequencies. The presently preferred high tier channel information element 380 provides a subscriber unit with the list of high tier channels by transmitting a starting high tier channel number 384 and an ending high tier channel number 386. Any available channel not identified as a high tier channel by the high tier channel information element 380 is automatically treated as a low tier channel by the subscriber unit.

Typical PACS in-service RF channels are spaced in multiples of three. Thus a high tier channel number is available for access by an SU if it has an offset that is a multiple of three from the starting high tier channel number 384 and is less than or equal to the ending high tier channel number 386. High tier channels need not be allocated in a single contiguous block. When high tier channels are not contiguous, additional starting and ending high tier channel number pairs 388 are broadcast in subsequent octets. In this manner, a range or ranges of high tier channels is supplied to PACS users. PACS network equipment may adjust the high tier channel list through broadcasting new information over the SIC. Preferably, the above listed parameters are stored in the memory section 66 of a SU 20.

The velocity determination timer (TS230) and the minimum and maximum ALT parameters (NS230 and NS231) are used by the subscriber unit to estimate its moving speed. The subscriber unit determines its velocity by counting the number of automatic link transfers (ALT) performed within the TS230 time period. The SU will then select an adequate high tier channel when it estimates that it is moving rapidly. Otherwise, the subscriber unit will select a low tier channel. The second hysteresis value parameter (NS240) and second QI saturation parameter (NS270) are used by the subscriber unit during a channel selection process to favor high tier channels over low tier channels. The DSP 49, or other processor, in the subscriber unit preferably executes the necessary calculations and manages signal measurements of the radio link.

The definition of high speed and low speed subscriber units may be changed by broadcasting a new velocity termination value (TS230) from an RPC to SUs operating within the network. The RPC may also transmit a new high speed threshold parameter (NS230) and a new maximum ALT parameter to change the system definition of high speed and low speed. When changes in these parameters and values are desired, the RPC may be instructed by a service provider to transmit new information. The RPC then transmits information elements having multiple octets of information to the SU over the system broadcast channel in the same manner as with the high tier channel list information element 380 described above. All of the parameters and values utilized in the presently preferred method are preferably provided to SUs in the information element format described above and set forth in greater detail in the PACS J-STD-014 standard.

Figure 9:
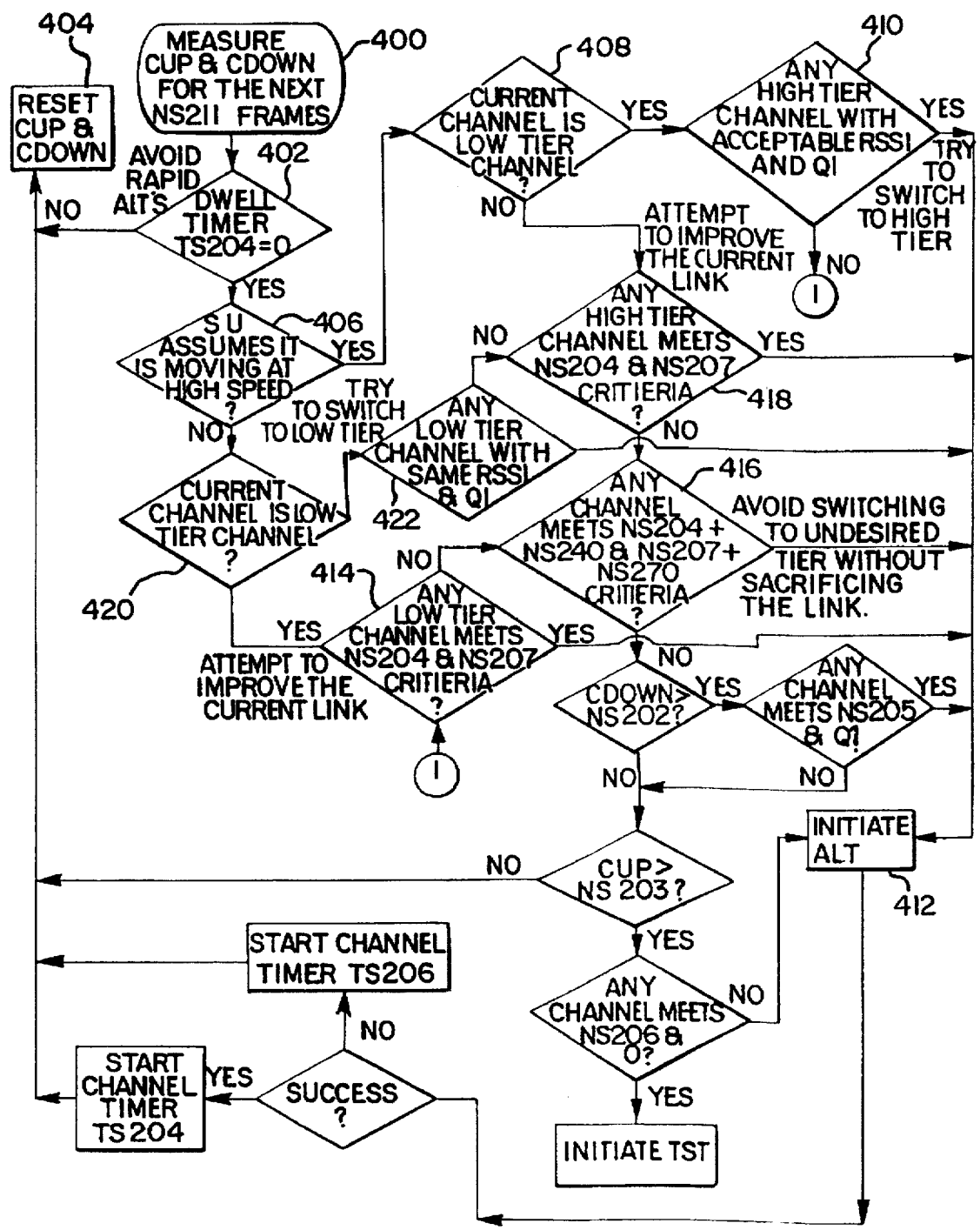
FIG. 9 is a flowchart of a preferred method of facilitating high mobility capabilities for PACS subscribers.

Referring to FIG. 9, a preferred method of determining speed of a subscriber unit and selecting the proper high or low tier channel is illustrated. Each subscriber unit examines the current radio link quality with a radio port by measuring 400 the number of errors in the uplink (Cup) and downlink (Cdown) for a predetermined number (NS211) of transmission frames. In PACS, each frame consists of 2.5 milliseconds divided evenly into eight time slots. After NS211 frames, the SU checks 402 a dwell timer (TS204) to determine if the minimum time between allowable ALTs has expired. As set forth in the PACS standard, the dwell timer defaults to a two second value. If the dwell timer (TS204) is a non-zero value, the SU resets 404 the Cup and Cdown values.

When the dwell timer expires, the SU determines 406 whether it is moving at a high or low speed based on the number of ALTs that have occurred in the past cycle of the velocity determination timer (TS230). The SU maintains a count of ALT operations performed within the last TS230 time period and stores this value in memory 66. A subscriber unit assumes it is moving at a high speed when the number of ALTs it records meets or exceeds the minimum threshold ALT parameter (NS230) within the TS230 period. The subscriber unit assumes that it is moving at a low speed when the number of ALTs performed is less than or equal to the low speed ALT threshold.

If the subscriber unit determines that it is moving at high speed, the subscriber unit examines 408, the current channel it is using. Assuming that the subscriber unit is currently using a low tier channel and that it is moving at a high speed, the subscriber unit will attempt 410 to find a high tier channel. The subscriber unit tunes to a high tier radio port channel and measures the RSSI and QI of that channel. The subscriber unit looks for a channel with a received signal strength indication (RSSI) and quality indication (QI) that is better than or equal to the current low tier link RSSI minus the second hysteresis value parameter (NS240) and the current QI minus the second QI saturation parameter (NS270). If a high tier channel is available with these characteristics, then the subscriber unit will initiate 412 an ALT and attempt to transfer the link to that channel. In this manner, the high tier channel is favored by a high speed subscriber unit even though the radio link quality is slightly less than that of the current low tier channel.

If a high tier link meeting these requirements does not exist, then the subscriber unit attempts to improve the current link by searching 414 for a low tier channel with better RSSI and QI. Preferably, the RSSI should be better than the current link by a first hysteresis value NS204 and the QI should be better than the current link by first QI saturation value NS207. The NS204 and NS207 parameters are provided for in the PACS standard and have default values of 6 dB for the NS204 and 17 dB for the NS207. If no low tier channels meeting the requirements exist, the SU will not find 416 any channel that is better than the existing channel and will not execute an ALT. In order to avoid an undesirable ALT, the new channel must preferably have a RSSI greater than or equal to the sum of NS204 and NS240, as well as a QI greater than or equal to the sum of NS207 and NS270.

Assuming that the subscriber unit is moving at a high speed 406 and is currently linked to a high tier channel, the subscriber unit will attempt to identify 418 a channel in the high tier candidate list with an RSSI value and a QI value greater than the current link. Preferably the new high tier channel must be NS204 dB higher than the current RSSI and the QI is at least NS207 higher than the current QI. A subscriber unit will attempt to switch to the first high tier channel meeting this criteria. The subscriber unit will scan 416 the remaining channels in the low tier candidate list if there are no high tier channels satisfying the above criteria.

A subscriber unit moving at high speed and linked to a high tier channel initially will only switch to a low tier channel if the RSSI of the low tier channel is at least NS204+NS240 dB higher and the QI is NS207+NS270 higher than these parameters in the existing high tier link. In this fashion, a fast moving subscriber unit avoids switching from a high tier link to a low tier link when possible. Assuming that the subscriber unit is moving at a low speed, this process would be reversed in favor of low tier channels. In the case where there is no available channel that meets any of the previous requirements, the subscriber unit will verify the uplink and downlink counts according to existing PACS procedures as set forth in the PACS Air Interface Standard J-STD-014 document.

If the SU is not moving 406 at a high speed, the SU determines 420 whether the present channel it is using is a low tier channel. Assuming that the present channel is a low tier channel, the SU will try to switch to another low tier channel by searching 414 for a low tier channel with improved RSSI and QI. Preferably the RSSI should be better than the current link by NS204 and the QI should be better than the current link by NS207. If no low tier channels meeting the requirements exist, the SU attempts to find 416 any channel that is better than the existing channel. Again, in order to avoid an undesirable ALT, this new channel must preferably have a RSSI greater than or equal to the sum of NS204 and NS240, as well as a QI greater than or equal to the sum of NS207 and NS270.

Subscriber units used with this invention may include hardware capable of handling multi-path fading that can exist in large coverage areas. This hardware can be implemented using post detection or other known technology. Because the presently preferred method operates within the framework of existing PACS protocols, subscriber units that do not incorporate the preferred method may be used. These subscriber units will not recognize, and will ignore, the new information elements broadcast in the system information channel and operate in a conventional manner. Therefore, subscriber units not equipped for this invention will continue to operate in any system that supports the present method. Conversely, subscriber units implementing the method of the present invention will be compatible with other systems when the subscriber unit roams in networks not equipped to implement the presently preferred method.

From the foregoing a method for improving the applicability of a PACS system in a high mobility environment has been described. The method includes the steps of determining the speed of a subscriber unit, receiving a list of high tier radio ports, and selecting a proper high tier or low tier radio port based upon the speed of the subscriber unit and the availability of high quality radio links to nearby radio ports. The method decreases the number of ALTs and thus improves voice quality. The present method also provides for optimizing use of available high and low tier channels by biasing a subscriber unit to try and lock onto low tier channels when it is moving at a slower speed.

It is intended that the foregoing detailed description be regarded as illustrative rather than limiting, and that it be understood that the following claims, including all equivalents, are intended to define the scope of this invention.

What is claimed is:

1. A method of optimizing a personal access communications system (PACS) for use with high and low mobility subscriber units comprising the steps of:
    providing a personal access communications system having a plurality of high tier coverage areas for handling high mobility users, and a plurality of low tier coverage areas, each of said high tier coverage areas encompassing a predetermined number of the low tier coverage areas;
    transmitting a list of all high tier channels from a radio port controller via a radio port to a subscriber unit in a system information channel within a system broadcast channel, by transmitting a starting high tier channel number and transmitting an ending high tier channel number whereby the subscriber unit will recognize that channels within a range defined by the starting and ending high tier channel numbers are high tier channels;
    determining a speed of the subscriber unit at the subscriber unit; and
    the subscriber unit selecting a channel in one of a high tier or low tier coverage area based on the determined speed of the subscriber unit, wherein the subscriber unit selects from the high tier channel list when selecting a high tier channel.

2. The method of claim 1 wherein the step of determining the speed of the subscriber unit comprises counting a number of automatic link transfers (ALTs) occurring within a predetermined time period.

3. The method of claim 2 wherein the subscriber unit determines whether it is moving at a high speed by comparing the number of automatic link transfers counted to a minimum ALT parameter.

4. The method of claim 2 wherein the subscriber unit determines whether it is moving at a slow speed by comparing the number of automatic link transfers counted to a maximum ALT parameter.

5. The method of claim 1 further comprising the step of setting a new high speed definition by transmitting a velocity determination timer from a radio port controller to a subscriber unit via a radio port.

6. The method of claim 1 further comprising the step of setting a new high speed definition by transmitting a new high speed threshold parameter from a radio port controller to a subscriber unit via a radio port.

7. The method of claim 1 further comprising the step of setting a new low speed definition by transmitting a new maximum ALT parameter from a radio port controller to a subscriber unit via a radio port.

8. The method of claim 1 wherein the subscriber unit is moving at a high speed and is communicating with a low tier channel, and wherein the step of selecting a channel comprises:

tuning the subscriber unit to one of a plurality of high tier channels;

measuring a received signal strength (RSSI) of the high tier channel;

measuring a carrier to interference quality indicator (QI) of the high tier channel;

comparing the RSSI and QI values of the high tier channel against RSSI and QI values of the low tier channel; and transferring the communication link to the high tier channel if the measured RSSI and QI of the high tier channel are above a predetermined level.

9. The method of claim 8, wherein the predetermined level for the RSSI is the measured RSSI of the low tier channel minus a first hysteresis value, and wherein the predetermined level for the QI is the measured QI of the low tier channel minus a QI saturation value, whereby a high mobility subscriber unit favors switching to a high tier channel.

10. The method of claim 1 wherein the subscriber unit is moving at a high speed and is currently communicating with a first high tier channel, and wherein the step of selecting a channel comprises:

tuning the subscriber unit to a second high tier channel;

measuring a received signal strength (RSSI) of the second high tier channel;

measuring a carrier to interference value (QI) of the second high tier channel; and transferring the communication link to the second high tier channel if the RSSI and QI measurements of the second high tier channel meet predetermined RSSI and QI measurement criteria.

11. The method of claim 10, wherein the RSSI and QI values for all available high tier channels are less than the predetermined RSSI and QI measurement criteria, further comprising the steps of:

measuring the RSSI and QI values of available low tier channels; and transferring the communication link from the first high tier channel to a low tier channel having an RSSI value of at least the sum of the predetermined RSSI criteria and a first hysteresis value and having a QI value of at least the sum of the predetermined QI criteria and a QI saturation value.

12. The method of claim 1 wherein the subscriber unit is moving at a low speed and is communicating with a first low tier channel, and wherein the step of selecting a channel comprises:

tuning the subscriber unit to a second low tier channel;

measuring a received signal strength (RSSI) of the second low tier channel;

measuring a carrier to interference quality indicator (QI) of the second low tier channel;

comparing the RSSI and QI values of the first low tier channel against RSSI and QI values of the second low tier channel; and transferring the communication link to the second low tier channel if the measured RSSI and QI of the second low tier channel are at least equal to the RSSI and QI of the first low tier channel.

13. A method of optimizing a personal access communications system (PACS) for use with high and low mobility subscriber units comprising the steps of:

providing a personal access communications system having a plurality of high tier coverage areas for handling high mobility users, and a plurality of low tier coverage areas, each of said high tier coverage areas encompassing a predetermined number of the low tier coverage areas;

transmitting a list of all high tier channels from a radio port controller via a radio port to a subscriber unit by transmitting a starting high tier channel number and transmitting an ending high tier channel number whereby the subscriber unit will recognize that channels within a range defined by the starting and ending high tier channel numbers are high tier channels;

determining a speed of the subscriber unit at the subscriber unit; and the subscriber unit selecting a channel in one of a high tier or low tier coverage area based on the determined speed of the subscriber unit, wherein the subscriber unit selects from the high tier channel list when selecting a high tier channel.

14. A method of optimizing a personal access communications system (PACS) for use with high and low mobility subscriber units comprising the steps of:

providing a personal access communications system having a plurality of high tier coverage areas for handling high mobility users, and a plurality of low tier coverage areas, each of said high tier coverage areas encompassing a predetermined number of the low tier coverage areas;

transmitting a list of all high tier channels from a radio port controller via a radio port to a subscriber unit;

determining a speed of the subscriber unit at the subscriber unit;

the subscriber unit selecting a channel in one of a high tier or low tier coverage area based on the determined speed of the subscriber unit, wherein the subscriber unit selects from the high tier channel list when selecting a high tier channel; and setting a new high speed definition by transmitting a velocity determination timer from a radio port controller to a subscriber unit via a radio port.

15. A method of optimizing a personal access communications system (PACS) for use with high and low mobility subscriber units comprising the steps of:

providing a personal access communications system having a plurality of high tier coverage areas for handling high mobility users, and a plurality of low tier coverage areas, each of said high tier coverage areas encompassing a predetermined number of the low tier coverage areas;

transmitting a list of all high tier channels from a radio port controller via a radio port to a subscriber unit;

determining a speed of the subscriber unit at the subscriber unit;

the subscriber unit selecting a channel in one of a high tier or low tier coverage area based on the determined speed of the subscriber unit, wherein the subscriber unit selects from the high tier channel list when selecting a high tier channel; and wherein the subscriber unit is moving at a high speed and is currently communicating with a low tier channel, said step of selecting a channel comprising the steps of:

tuning the subscriber unit to one of a plurality of high tier channels;

measuring a received signal strength (RSSI) of the high tier channel;

measuring a carrier to interference quality indicator (QI) of the high tier channel;

comparing the RSSI and QI values of the high tier channel against RSSI and QI values of the low tier channel; and transferring the communication link to the high tier channel if the measured RSSI and QI of the high tier channel are above a predetermined level, wherein the predetermined level for the RSSI is the measured RSSI of the low tier channel minus a first hysteresis value, and wherein the predetermined level for the QI is the measured QI of the low tier channel minus a QI saturation value, whereby a high mobility subscriber unit favors switching to a high tier channel.

16. A method of optimizing a personal access communications system (PACS) for use with high and low mobility subscriber units comprising the steps of:

providing a personal access communications system having a plurality of high tier coverage areas for handling high mobility users, and a plurality of low tier coverage areas, each of said high tier coverage areas encompassing a predetermined number of the low tier coverage areas;

transmitting a list of all high tier channels from a radio port controller via a radio port to a subscriber unit;

determining a speed of the subscriber unit at the subscriber unit;

the subscriber unit selecting a channel in one of a high tier or low tier coverage area based on the determined speed of the subscriber unit, wherein the subscriber unit selects from the high tier channel list when selecting a high tier channel;

wherein the subscriber unit is moving at a high speed and is currently communicating with a first high tier channel, said step of selecting a channel comprising the steps of:

tuning the subscriber unit to a second high tier channel;

measuring a received signal strength (RSSI) of the second high tier channel;

measuring a carrier to interference value (QI) of the second high tier channel;

transferring the communication link to the second high tier channel if the RSSI and QI measurements of the second high tier channel meet predetermined RSSI and QI measurement criteria; and wherein the RSSI and QI values for all available high tier channels are less than the predetermined RSSI and QI measurement criteria, measuring the RSSI and QI values of available low tier channels and transferring the communication link from the first high tier channel to a low tier channel having an RSSI value of at least the sum of the predetermined RSSI criteria and a first hysteresis value and having a QI value of at least the sum of the predetermined QI criteria and a QI saturation value.

* * * * *